May 26, 1959     D. W. HAGLUND     2,888,247
ROCK DRILL CUTTING INSERT OF SINTERED HARD METAL
Filed Dec. 3, 1956
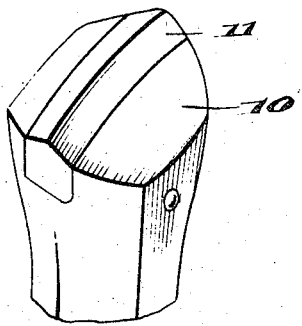
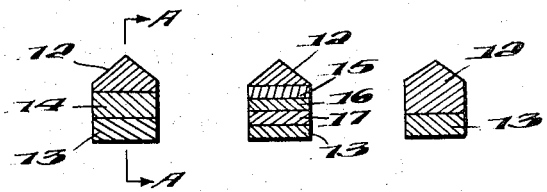
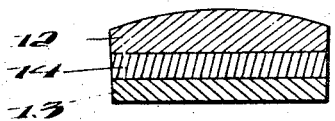 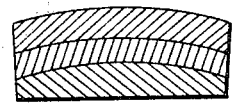
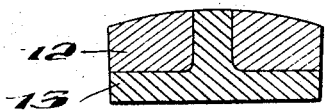
INVENTOR
Didrik Wilhelm Haglund
BY
Pierce, Scheffler & Parker ATTORNEYS United States Patent Office 2,888,247
Patented May 26, 1959

2,888,247

ROCK DRILL CUTTING INSERT OF SINTERED HARD METAL

Didrik Wilhelm Haglund, Sandviken, Sweden, assignor to Sandvikens Jernverks Aktiebolag, Sandviken, Sweden, a corporation of Sweden Application December 3, 1956, Serial No. 625,924

Claims priority, application Sweden December 13, 1955

4 Claims. (Cl. 255—63)

The following invention relates to a rock drill cutting insert consisting of hard metal grains, for instance tungsten carbide, and bonding metal such as cobalt. The cutting insert, which is built up of two or more layers of different wear resistance and toughness, is substantially characterized in that of two adjacent layers the layer positioned closest to the cutting edge has a greater resistance to wear but less toughness than for the adjacent layer, and that the sum of the bonding metal content in weight percentage and twice the medium grain size in microns for the layer closest to the cutting edge is between 0.5 and 3.5 units less than the corresponding value for said adjacent layer.

The hitherto known rock drill cutting inserts of hard metal have usually been produced of a homogeneous hard metal, by which is meant a hard metal with the same grain size and chemical composition from top to bottom. By hard metal is meant a sintered alloy, which substantially consists of one or more carbides, for instance tungsten carbide and/or other hard materials, and bonding metals such as cobalt and/or other metals from the iron group in the periodical system.

Of the greatest importance for the performance of a rock drill cutting insert is that it has a high wear resistance in order to give a large number of drilled meters in relation to used hard metal and that it has a satisfactory mechanical strength in order to avoid crumbling or crushing after a relatively short use on account of the great percussion shocks to which it is exposed during drilling with a modern percussion drilling machine.

However, it has shown itself to be very difficult to combine these two qualities in one cutting insert of the above mentioned homogeneous type. Thus if its hardness is increased and therewith its resistance to wear the cutting insert becomes more fragile, and on the other hand if the toughness is increased and therewith the mechanical strength the cutting insert becomes less wear resistant.

Therefore it has earlier been suggested to produce hard metal cutting inserts with zones of different wear resistance, for instance in such a manner that a more wear resisting hard metal is placed at the ends of the insert at the periphery of the drill bit or in one or more relatively thin zones arranged parallel with the side surfaces of the cutting insert. The more wear resistant material has usually had a lower content of bonding metal than the tougher material. Further it is known that a difference in wear resistance also may be accomplished by a suitable choice of carbides or by some suitable choice of grain size in the hard metal.

By means of the cutting insert according to the invention several essential advantages are won in comparison with the earlier known inserts. Some of these advantages will be mentioned in the following description.

The mechanical strength of a rock drill cutting insert decreases as a result of the fact that its height is decreased by the wearing down. At last the cutting insert may not longer resist the bending strains and breaks. If the cutting insert consists of a hard, wear resistant hard metal its height after a certain number of drilled meters is greater than for a cutting insert with a less wear resistant, tougher hard metal, which latter insert may consume more hard metal for the same number of drilled meters. The tougher cutting insert may, however, be worn down to a lower cutting height than the harder and more wear resistant insert before it breaks on account of the mechanical strains.

The advantages of the above mentioned two types of cutting inserts may be utilized in the same cutting insert according to the invention because the upper layer of the cutting insert with the cutting edge consists of more wear resistant hard metal. The cutting insert according to the invention may also be composed of more than two layers in which the different layers may have such a resistance to wear and toughness that the resistance to wear increases from layer to layer toward the upper part of the cutting insert with the cutting edge, at the same time as the toughness increases from layer to layer toward the bottom of the insert.

It is clear that the resistance to wear increases at constant cobalt content with decreased grain size and at the same grain size with decreased cobalt content. My investigations have shown a connection between the resistance to wear of the hard metal, the grain size of the hard material and the cobalt content. Thus the resistance to wear of the hard metal may be characterized by a value $T=$ the sum of the bonding metal content in weight percentage and twice the grain size of the hard material in microns. The less is this value the more wear resistant is the hard metal, and two hard metals with the same T-value are essentially equivalent and give the same drilling result.

I have found out that it is of essential importance for obtaining the extraordinary qualities of the cutting inserts according to the invention that the difference in resistance to wear between two adjacent layers is chosen within certain stated, relatively narrow limits. Thus for two adjacent layers the layer closest to the bottom of the insert is to have a T-value, i.e. the sum of the bonding metal content in weight percentage and twice the medium grain size in microns, between 0.5 and 3.5 units greater than the T-value of the layer positioned closest to the cutting edge of the insert. Preferably the difference in T-value between the two adjacent layers is between 1 and 3 units.

Further in my investigations I have found that the uppermost layer of the insert with the cutting edge which preferably is to be responsible for the resistance to wear of the cutting insert may be produced of hard metal with a T-value less than 14 and preferably greater than 11. Usually for this layer, a T-value is chosen between 11.5 and 12 or 13.5. For the bottom layer of the cutting insert the T-value is to be at least 13 and preferably between 14 and 17. In the sintering of an insert which is made of two different hard metals a diffusion of cobalt takes place. This phenomenon tends to equalize the T-values of the adjacent hard metal layers. Thus the tougher layer may not have maximum toughness and such a combination will not give top results in drilling.

Therefore the difference in T-values in the bottom layer and the top layer may not exceed 3 to 3.5 units. If a greater difference in wear resistance between the mentioned layers is desired, the insert must contain one or more interposed layers.

According to the invention the bottom layer is more fine-grained than the uppermost layer of the cutting insert with the cutting edge. It is essential that the condition for the difference in wear resistance between the layers is fulfilled. Often it is, however, advantageous to make the bottom layer more fine-grained than the top layer, the latter of which is to have a relatively coarse grain size. It has been shown that in this type of cutting inserts the medium grain size for the hard material in the uppermost layer with the cutting edge is to be more than 1.5 and preferably more than 1.8 microns but less than 4 microns if the desired wear resistance is to be obtained. For certain species of stone the medium grain size for this layer is chosen between 2.0 and 3.8 microns. For the bottom layer in this type of cutting inserts the medium grain size is to be more than 1 micron e.g. between 1.2 and 3.0 microns.

By making the bottom layer fine-grained the bonding metal content in this part may be increased. In this case a better possibility in brazing and less difference in coefficient of expansion in relation with the steel is obtained and therewith decreased brazing stresses and also an improved percussion toughness. In this type of cutting inserts also the bonding metal content increases at the same time as the medium grain size decreases from layer to layer in the direction from the cutting edge of the insert toward its bottom. It has also been shown to be advantageous that for the uppermost layer of the cutting insert with the cutting edge a bonding metal content is used, e.g. cobalt content, between 5 and 10%, preferably between 5.5 and 9%. For the bottom layer is then suitably used 7-14% and preferably 8-12% of bonding metal. Further it may be advantageous that the hard metal grains and/or the bonding metal of the different layers have substantially the same chemical composition. It is of course also possible to use hard metal grains and bonding metal with different chemical composition in different layers.

According to the invention the upper layer of the cutting insert with the cutting edge has the more wear resisting hard metal and its bottom layer the tougher hard metal. In the use of the cutting insert the more wear resisting hard metal of the cutting insert may be used first, when the cutting height is relatively high. When the cutting height is decreased by wear, the cutting inserts may more and more consist of the tougher hard metal. In this way a very good utilization of the cutting insert material is obtained. Simultaneously, since it has a high wearing strength, the toughness is such that the cutting insert is worn down to a low cutting height before the cutting insert will reach the danger zone for crushing on account of the mechanical stresses.

The boundaries of the layers usually are parallel or substantially parallel with the insert bottom. In certain cases it may for example be advantageous to have the boundaries of the layers curved in order to have the more wear resistant and tougher hard metal extend into the adjacent layer. The insert may be built in two or more layers. If it is built in two layers, the height of the bottom layer preferably is 3/10 to 9/10 of the greatest height of the insert and if the insert is built in three layers the bottom layer and the medium layer may each have a height which is at least 2/10 of the greatest height of the insert.

The difference in medium grain size between adjacent layers may be at least 0.25 micron and preferably at least 0.5 micron.

The invention will be further described in connection with the accompanying drawing, which shows some embodiments of the invention.

Fig. 1 shows perspectively a rock drill bit with a hard metal insert,

Figs. 2, 3 and 4 show different embodiments of the insert according to the invention in cross section, Fig. 5 shows a section along the line A—A in Fig. 2, and Figs. 6 and 7 show corresponding sections through alternative embodiments.

In the drill bit 10 shown in Fig. 1 a hard metal insert 11 is fastened into a groove by means of brazing or in any other suitable way. The drill bit may be provided with several cutting inserts, for instance four cutting inserts arranged in cross form and every insert may be separated into two or more separate parts. These are well known expedients. The invention is not limited to the shape of the inserts shown in the drawings and may have any other form within the scope of the appended claims. Thus the cutting insert may for example be formed with side surfaces converging or diverging in the drilling direction as a result of which the base part or top part may be the broadest part.

Figs. 2–4, which show sections perpendicular to the cutting direction of the cutting insert, show some examples of arrangements of the different hard metal layers. In Fig. 4 which shows the simplest embodiment, 12 is the more wear resistant layer and 13 is the tougher layer. The embodiment in accordance with Fig. 2 has a third layer 14 and according to Fig. 3 layers 15, 16 and 17 are interposed between the more wear resistant layer 12, and the tougher layer 13, said layers being arranged with increasing toughness toward the bottom of the cutting insert. Of course it is possible further to increase the number of the layers.

By choosing suitable grain sizes and bonding metal contents for the different layers the desired qualities are obtained for the cutting insert i.e. great wear resistance in the upper part oft he cutting insert and satisfactory toughness in its bottom part. The chemical composition of the hard material grains and the bonding metal may be substantially the same for the whole cutting insert or may be varied for the different layers.

The cutting insert consists of a sintered unit and the boundaries between the layers may, at least as to grain sizes in the different layers, be relatively sharp. In certain cases the boundaries may be less sharp, showing a continuous variation from layer to layer as to grain size and bonding metal content. The layer boundaries in transverse direction as shown in Figs. 2, 3 and 4 may be substantially parallel with the bottom of the insert. Also the boundaries in the longitudinal direction of the cutting insert may as appears in Fig. 5 be substantially parallel with the insert bottom. Alternatively the boundaries may be curved in the longitudinal direction, for example as shown in Fig. 6, or angularly or polygonally formed. The layered hard metal may also be separated into two or more zones in the longitudinal direction of the insert, between which zones tougher hard metal is positioned. Since it is the corner parts of the cutting insert which are most worn it may be advantageous to provide these parts with the more wear resistant hard metal while the tougher hard metal forms the bottom layer and the central part of the insert as shown in Fig. 7.

In the following Tables I and II data for some different rock drill inserts in accordance with the invention are given. The layer limits for these inserts are substantially parallel with the bottom surface of the cutting insert and the inserts have a maximum height of about 16 mm. The letter T in the tables designates the sum of the bonding metal content in weight percentage and twice the medium grain size in microns.

Table I shows inserts built in two layers, one of which is a more wear resistant top layer and one a tougher bottom layer, the latter of which has a maximum height of about 5 to 8 mm. as appearing in the table.

Table II shows inserts built in three layers, the medium layer of which has a maximum height of about 4 mm. and the bottom layer about 5 mm.

In the tables the medium grain size in microns is indicated by the symbol $d_m$.

Table I

| No. | Upper Layer | | | Bottom layer | | | | Difference in T |
|---|---|---|---|---|---|---|---|---|
| | Co, percent | $d_m$, μ | T | Co, percent | $d_m$, μ | T | Height, mm. | |
| 1 | 8 | 2.7 | 13.4 | 10 | 2.3 | 14.6 | 5 | 1.2 |
| 2 | 8 | 2.1 | 12.2 | 11 | 1.7 | 14.4 | 5 | 2.2 |
| 3 | 6 | 3.4 | 12.8 | 10 | 2.3 | 14.6 | 5 | 1.8 |
| 4 | 7 | 2.9 | 12.8 | 11 | 1.7 | 14.4 | 5 | 1.6 |

Table II

| No. | Upper layer | | | Medium layer | | | | Bottom layer | | | | Difference in T |
|---|---|---|---|---|---|---|---|---|---|---|---|---|
| | Co, percent | $d_m$, μ | T | Co, percent | $d_m$, μ | T | Height, mm. | Co, percent | $d_m$, μ | T | Height, mm. | |
| 5 | 6 | 3.0 | 12.0 | 9 | 2.3 | 13.6 | 4 | 12 | 2.2 | 16.4 | 5 | 1.6+2.8 |
| 6 | 6 | 3.0 | 12.0 | 9 | 2.3 | 13.6 | 4 | 13 | 1.7 | 16.4 | 5 | 1.6+2.8 |

By medium grain size is meant the diameter of a spherical grain, which has the same cross section as the medium cross section of the actual grains. For determining the medium grain size $d_m$ the number of grains in a certain surface of a microphotograph may be counted and the following formula applied;

$$d_m = \frac{1.5}{\text{enlargement}} \cdot \sqrt{\frac{\text{picture surface} \cdot \text{volume part carbide phase}}{\text{number of grains}}}$$

In this formula account is taken of the fact that the grains are not usually cut centrally along a surface corresponding with the grain size, but along a smaller cross section.

In comparison with the earlier used cutting inserts the insert according to the invention provides a substantially better utilization of the material because the insert may be worn considerably thinner, which gives, together with its more wear resistant upper part a considerably increased number of drilled meters, before the drill bit has to be rejected.

This application is a continuation-in-part of my application Serial No. 520,308 filed July 6, 1955.

I claim:

1. In a percussion rock drill bit a sintered insert having a cutting edge surface, an oppositely disposed substantially plane bottom surface and substantially plane side surfaces, said insert consisting of at least two layers in the direction from said cutting edge surface toward said bottom surface, said layers being formed of hard metal carbide grains and bonding metal, the boundary between each pair of adjacent layers of said insert being substantially parallel to said bottom surface, a layer nearer to said cutting edge surface being more wear resistant and less tough than a layer nearer to said bottom surface, the layer including the cutting edge surface having a mean grain size of between 1.5 and 4 microns and a bonding metal weight content between 5 and 10%, the next adjacent layer having a mean grain size of between 1 and 3 microns and a bonding metal weight content of between 7 and 14%, the mean grain size of said grains of hard metal carbide decreasing and the bonding metal content increasing from layer to layer in the direction from the cutting edge surface to said bottom surface, the difference in mean grain size between two adjacent layers being at least 0.25 micron, the sum of the bonding metal content in weight percent and twice the mean grain size in microns for the uppermost layer of the insert including the cutting edge surface being within the range from 11 to 14 and the corresponding sum for the layer including the bottom surface being within the range 13 to 17, the said sum increasing from layer to layer in the direction from the cutting edge surface to the bottom surface by from 1 to 3 units.

2. Rock drill cutting insert according to claim 1 characterized in that the cutting insert is built in two layers, the height of the bottom layer of which is from 3/10 to 9/10 of the greatest height of the insert.

3. Rock drill cutting insert according to claim 1 characterized in that the insert is built in three layers, the bottom and medium layers of which each has a height which is at least 2/10 of the greatest height of the insert.

4. A percussion rock drill bit as defined in claim 1 in which the difference in the mean grain size between two adjacent layers is at least 0.50 micron.

References Cited in the file of this patent

UNITED STATES PATENTS 2,582,231     Catallo               Jan. 15, 1952

FOREIGN PATENTS 634,743     Great Britain         Mar. 29, 1950